Nov. 25, 1941.  E. R. NEEPER  2,264,097
SAFETY DEVICE FOR VEHICLES
Filed Oct. 20, 1939  4 Sheets-Sheet 1
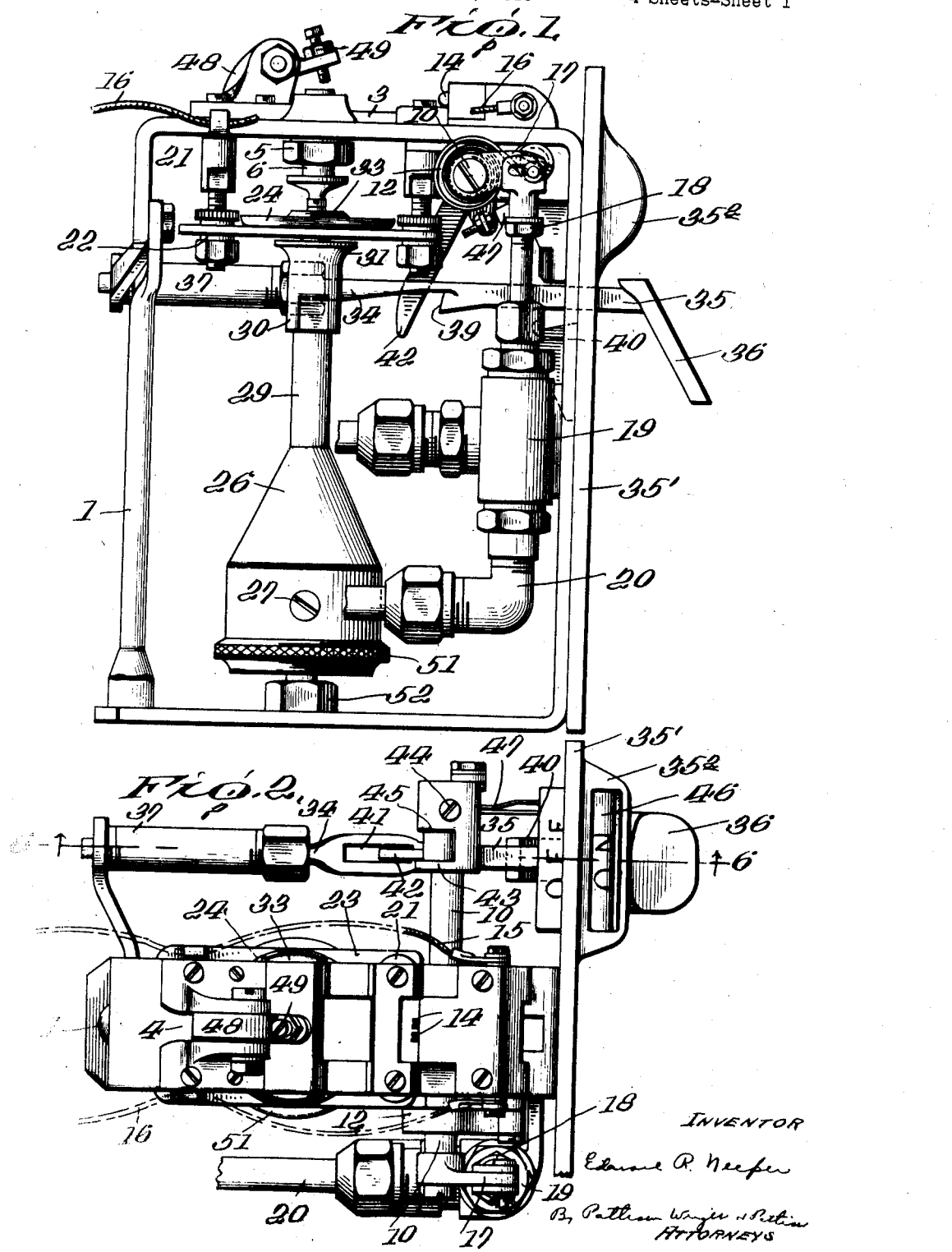
INVENTOR
Edward R. Neeper
By Patterson Wagner & Patten
ATTORNEYS

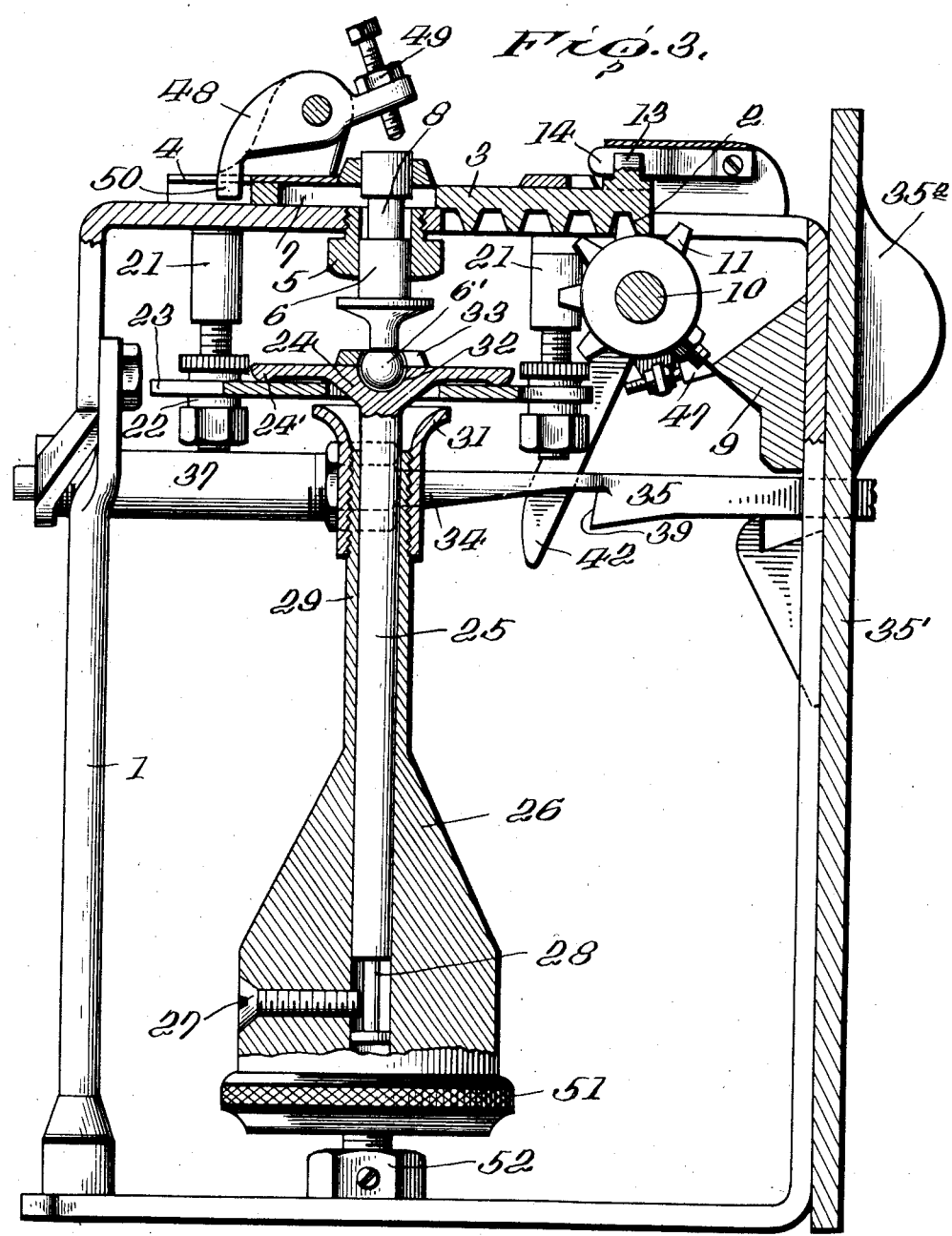
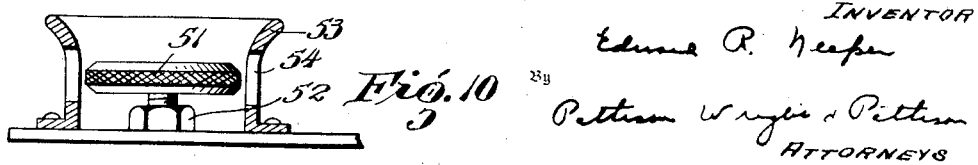

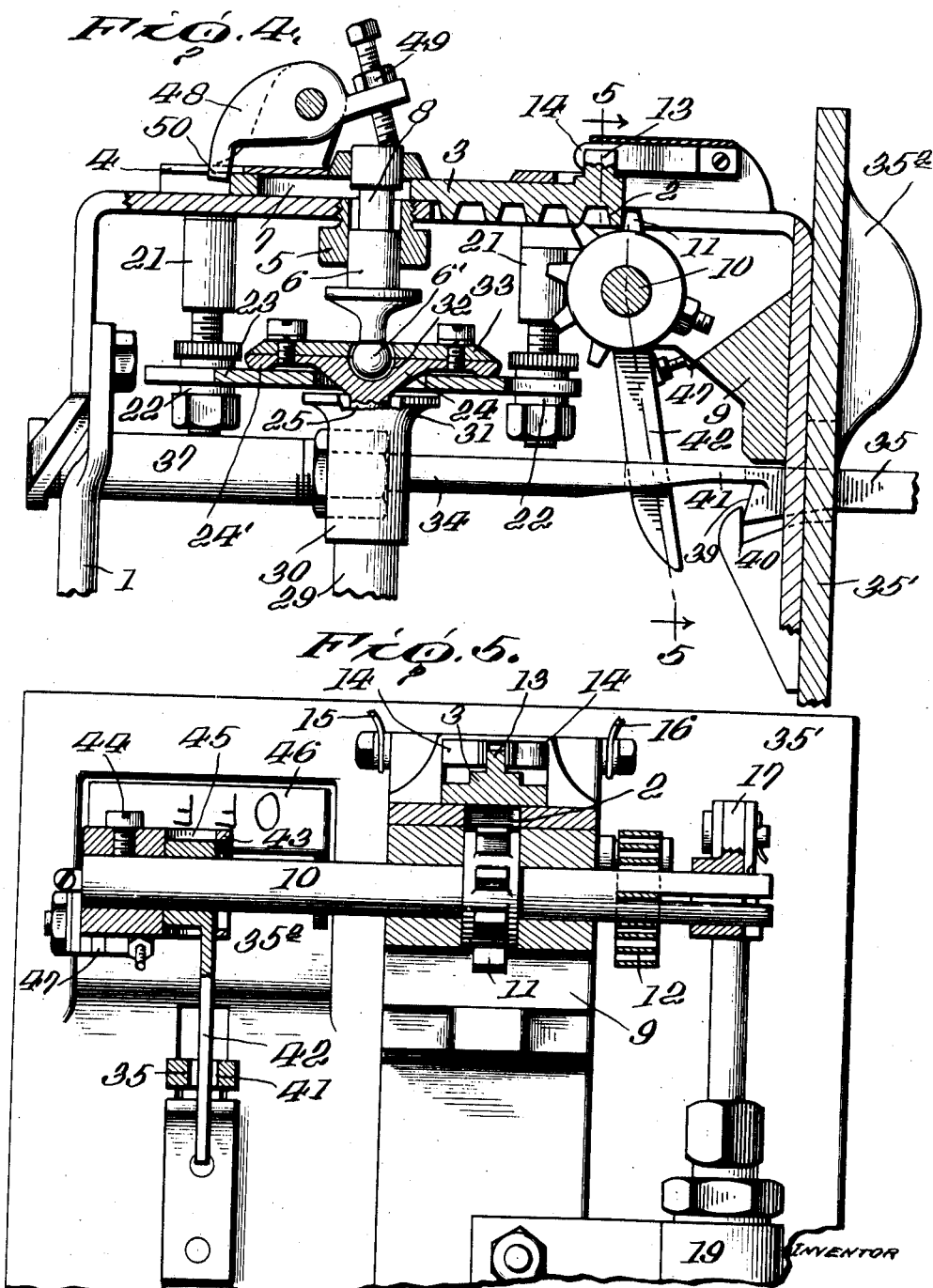

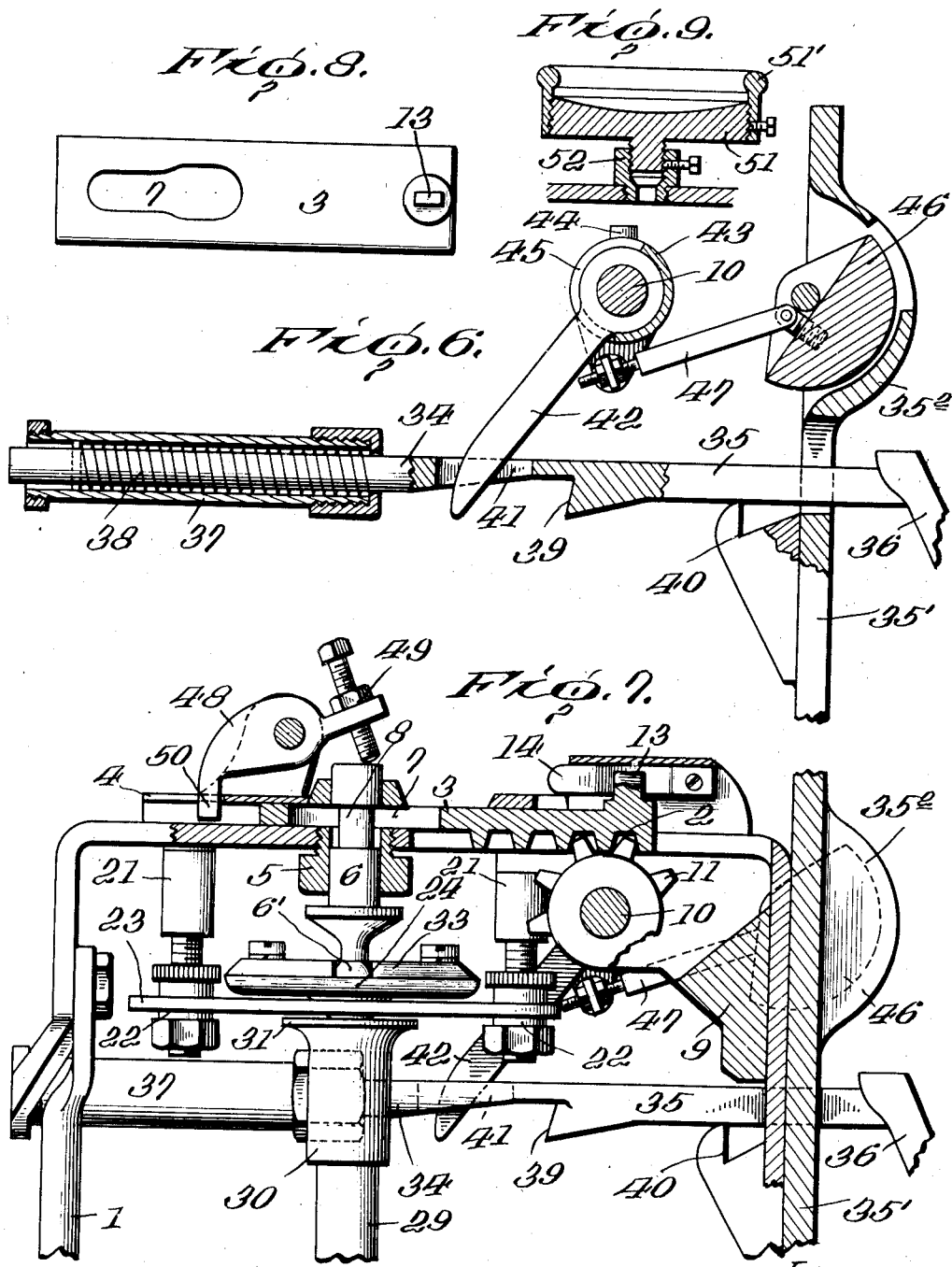

Patented Nov. 25, 1941

2,264,097

UNITED STATES PATENT OFFICE 2,264,097

SAFETY DEVICE FOR VEHICLES

Edward R. Neeper, Colorado Springs, Colo.

Application October 20, 1939, Serial No. 300,485

15 Claims. (Cl. 200—52)

This invention relates to certain new and useful improvements in safety device for motor vehicles as disclosed in my application, Serial Number 220,153, filed July 19, 1938, the object being to simplify the construction and to provide novel means for locking the device and resetting the same.

Another object of my invention is to provide novel means for preventing vertical movement of the weight of the pendulum caused by the vehicle dropping into a depression, such as are found on corduroy roads or a ditch or the like, whereby the device is prevented from being tripped under such circumstances and the operator will have control of the vehicle to which the device is attached.

Another object of my invention is to provide a seat for a pendulum having an annular ring or cup surrounding the same, one being adjustable in respect to the other so as to control the movement of the pendulum whereby the same can be adjusted or set so as to operate at any angle or any impact.

A still further object of the invention is to provide a safety device for motor vehicles in which the parts are so arranged and adjustably mounted in respect to one another that the device can be used in connection with any type of ground motor vehicle or any type of air motor vehicle and when adjusted to suit the vehicle upon which it is used it will operate at the proper time to cut off the supply of fuel and the supply of electrical energy in case of a crash or any other abnormal movement whereby the vehicle will be prevented from catching on fire.

Other and further objects and advantages of the invention will be hereinafter set forth and the novel features thereof defined by the appended claims.

In the drawings,

Figure 1 is a side elevation of my improved construction of safety device;

Figure 2 is a top plan view of the same;

Figure 3 is a vertical section;

Figure 4 is a detail vertical section showing the device in locked position;

Figure 5 is a section taken on line 5—5 of Figure 4;

Figure 6 is a section taken on line 6—6 of Figure 2;

Figure 7 is a vertical section, partly in elevation, showing the device in a tripped position;

Figure 8 is a top plan view of the spring-actuated member;

Fig. 9 is a detail sectional view of the pendulum seat;

Figure 10 is a detail view, partly in section, showing a slightly modified form of seat for the pendulum.

In carrying out my invention, I employ a frame 1, the upper horizontal bar of which is provided with a slot through which extends the rack portion 2 of a spring-actuated plate 3 which is slidably mounted in a suitable guideway 4 disposed therein.

The frame is provided with a bearing 5 in which is mounted a locking pin 6 which extends upwardly through a keyhole slot 7 formed in the spring-actuated plate 3, said pin being provided with an annularly reduced portion forming an annular groove 8 extending upwardly through the slot as shown and adapted to lock the plate against movement as will be hereinafter fully described.

Mounted in suitable bearings 9 carried by the frame is a shaft 10 provided with a segmental gear 11 which is adapted to engage the rack 2 of the spring-actuated plate 3, said shaft being oscillated by a helical spring 12, so that the plate is spring actuated through the medium of the shaft and gear.

The spring-actuated plate 3 carries a bridge member 13 adapted to bridge a pair of spring-actuated contacts 14 to which are connected leads 15 and 16 extending from the source of electrical supply to the internal combustion engine so as to make and break the contact.

One end of the shaft 10 carries an arm 17 connected to a valve stem 18 of a valve 19 disposed in the fuel supply 20 leading from the source of fuel supply so that when the circuit is broken, the valve is closed in order to cut off the fuel supply to the internal combustion engine.

While in the drawings I have shown the circuit maker and breaker and the valve in a certain position in respect to the device, it is, of course, understood that these can be disposed at any point and connected through suitable linkage so as to cut off the fuel supply at its source or elsewhere, or the electrical energy at its source or elsewhere.

Depending from the horizontal portion of the frame are posts 21 provided with adjustable nuts 22 carrying a support 23 in such a manner that the support can be adjusted in respect to the upper horizontal bar of the frame upon which the spring-actuated member is mounted. The support 23 is provided with an opening to receive the enlarged portion 24 of a pendulum stem 25 upon which is mounted the weight 26 forming the pendulum, the movement of the pendulum on the stem being limited by a screw 27 working in an annularly reduced portion 28 of the stem as clearly shown in Figure 3 in order to allow the weight 26 to slide on the stem 25. The weight 26 is provided with a sleeve portion 29 externally threaded at its upper end on which is arranged a nut 30. This nut may be provided with an annular flange 31 having a greater diameter than the opening in the supporting plate so as to limit the upward movement of the weight of the pendulum on its stem in order to prevent the pendulum and the pin 6 from being moved or creeping upwardly and thus operating the device unwantedly by repeated moderate upward thrusts caused by the vehicle dropping in moderate depressions, such as a corduroy road.

The enlarged portion 24 of the stem 25 is provided with a spherical seat 32 in which the spherical end 6' of the locking pin 6 is secured by a plate 33 so as to form a positive connection between the stem and the locking pin whereby when the stem is moved upwardly, the pin will be shoved upwardly into such a position that the spring-actuated pin will be released. The enlarged portion 24 of the stem extends outwardly to form a circular disc 24' which is mounted on the support 23 and forms a fulcrum for the pendulum so as to increase the leverage to overcome the resistance of the spring-actuated plate in order to release the same.

In order to provide means for setting the device, I provide an operating rod 34 which works through the instrument board 35' to which the frame is herein shown connected, said operating rod being provided with a handle 36. The inner end of the operating rod 35 is mounted in a guide sleeve 37 and is surrounded by a coil spring 38 which normally has the tendency to force the rod inwardly. The rod is provided with a lug 39 which is adapted to cooperate with a notch 40 so as to lock the device.

In order to provide an operative connection between the operating rod 35 and the spring-actuated shaft 10, I provide the same with a slot 41 in which extends a crank arm 42 carried by the shaft 10 and surrounded by a sleeve 43 fixed on the shaft 10 by a screw 44, said sleeve 43 being provided with a slot 45 in which the arm works in order to form a lost motion connection between the shaft and the operating rod.

The instrument board 35' is provided with an enlarged portion 35² having a sight opening in which is mounted an indicator 46 which has marked thereon the words "Off," "On" and "Stunt," the word "Stunt" not being shown in the drawings. The indicator 46 is connected to the sleeve 43 by an adjustable link 47 so that when the device is in any of the three above mentioned positions, the aviator or the driver of the vehicle will be notified of the position of the device.

In order to provide a positive lock for preventing the pin from being moved upwardly, as for example, when the device is set for stunt flying, I provide a pivoted dog 48 which is provided with an adjustable screw 49 adapted to engage the upper end of the pin 6 so as to hold the pin downwardly, the dog being provided with a tail portion 50 arranged in the path of travel of the spring-actuated plate 3 so that when the device is in the position as shown in Figure 4, the dog is prevented from rocking on its bearing and the adjustable screw is held into engagement with the pin so that the spring-actuated plate 3 is locked against sliding movement.

The pendulum is mounted on an adjustable seat 51 and as the weight rests on this seat, it can be vibrated up and down without moving the stem of the pendulum. The seat 51 is provided with a threaded stem working in a nut 52 mounted in the base so that by turning the same it can be adjusted up and down. The seat 51 is externally threaded on which is threaded an internally threaded ring 51' adapted to be adjusted up and down in respect to the seat to retard the movement of the pendulum to regulate the movement of the same so that it can be adjusted to move either by a slight impact or terrific impact, or if desired the seat 51 can be surrounded by a cup member 53 as shown in the modification in Figure 10, said cup member 53 being provided with slots 54 in order to allow the seat to be turned in order to adjust the position of the seat in respect to the upper end of the cup member whereby the impact of a head-on collision can be determined as to the tripping of the same or in other words, if the cup is raised above the seat, it would require a more severe impact to cause the pendulum to swing over the cup and to trip the same than it would if the seat were lowered. In either construction, the weight of the pendulum is free to move independently of the stem and as the stem carries a disc mounted on an adjustable support through the medium of the adjustability of the same, the device can be set so that it will trip at any angle or any impact.

In the operation of the device when the device is in the "on" position as shown in Figures 1 and 3, when the pendulum swings by gravity or is thrown off the seat by impact, the stem rocks on the adjustable support through the medium of the disc so as to increase the fulcrum and force the pin upwardly so as to bring the reduced portion in alignment with the narrow portion of the keyhole slot 7 of the spring-actuated member 3 and the spring-actuated member is released and moved to the right so as to break the electric circuit and simultaneously close the valve in the fuel supply.

When the operating member is pulled outwardly, the arm 42 which extends through the slot 41 of the operating member is rocked so as to move the spring-actuated member 3 into such a position that it will lock by the pin 6. When the operating member is drawn outwardly so that the lug 39 engages the notch 40, the device is locked in set position so that it is prevented from being tripped by the pendulum swinging.

In all of these positions, the indicator is moved so as to indicate to the operator of the vehicle the position of the device.

It will be seen that when the device is in the position shown in Figure 4, that the operating lever is not only locked but the pin 6 is locked by the pivoted dog and through the medium of the operating member, all the parts can be moved back into normal position and there held in such a position that the device will be tripped by the movement of the pendulum or be prevented from being tripped.

The operating rod through its loose connection and the particular construction allows the parts to be reset and as the operating rod is spring actuated, unless it is held in position for stunt flying, it returns in such a position that the device can be tripped when the pendulum swings to such an extent as to cause the pin to move upwardly in order to release the spring-actuated member.

This construction is exceedingly simple and a positive connection is formed between the pendulum and the locking pin of the spring-actuated member and as the parts are adjustable, it can be set so that it will trip by a predetermined impact. The spring-actuated shaft through the rack and gear connection with the member 3 causes the member 3 to be normally held in one position and when moved out of that position, it is held under tension by the locking pin so that when released, the circuit will be broken and the fuel supply cut off.

From the foregoing description it will be seen that I have provided a safety device for motor vehicles or the like which is composed of a very few parts so arranged that all danger of the same getting out of order in operation is prevented and the members adjustably mounted in respect to one another so that the device can be adjusted to trip at a predetermined shock or a predetermined angle.

What I claim is:

1. A safety device of the kind described comprising a spring-actuated member having a rack portion, a spring-actuated shaft having a gear meshing with said rack portion, a lever for oscillating said shaft, a pin for locking said spring-actuated member and a pendulum having a positive connection with said pin for moving said pin in position to release said spring-actuated member.

2. A safety device of the kind described comprising a spring-actuated member having a rack portion, a spring-actuated shaft having a gear meshing with said rack portion, a lever for oscillating said shaft, a pin for locking said spring-actuated member, a pendulum having a positive connection with said pin for moving said pin in position to release said spring-actuated member and a pivoted dog for preventing the movement of said pin.

3. A safety device of the kind described comprising a slidably mounted member having a rack portion, a spring-actuated shaft carrying a gear meshing with said rack portion, a pin for locking said slidably mounted member, a pendulum having a positive connection with said pin and means for oscillating said shaft.

4. A safety device of the kind described comprising a slidably mounted plate having a rack portion and provided with a keyhole slot, a pin working in said slot having a reduced portion, an adjustable support, a pendulum having a stem provided with a disc mounted on said adjustable support, a shaft having a gear meshing with said rack portion, a spring for oscillating said shaft and means for oscillating said shaft to move said plate in position to be locked by said pin.

5. A safety device of the kind described comprising a slidably mounted plate having a rack portion and provided with a keyhole slot, a pin working in said slot having a reduced portion, an adjustable support, a pendulum having a stem provided with a disc mounted on said adjustable support, a shaft having a gear meshing with said rack portion, a spring for oscillating said shaft, means for oscillating said shaft to move said plate in position to be locked by said pin and an indicator operated by said shaft.

6. In a safety device of the kind described, the combination with a slidably mounted plate having a rack portion and provided with a keyhole slot, of a locking pin extending through said keyhole slot having an annularly reduced portion, an adjustable support, a pendulum having a disc mounted upon said support, a ball and socket connection between said pin and said pendulum, a spring-actuated shaft carrying a gear meshing with said rack portion and an operating rod for oscillating said shaft.

7. In a safety device of the kind described, the combination with a slidably mounted plate having a rack portion and provided with a keyhole slot, of a locking pin extending through said keyhole slot having an annularly reduced portion, an adjustable support, a pendulum having a disc mounted upon said support, a ball and socket connection between said pin and said pendulum, a spring-actuated shaft carrying a gear meshing with said rack portion, an operating rod for oscillating said shaft and an indicator operated by said shaft.

8. A safety device of the kind described comprising a slidably mounted plate having a rack portion provided with a keyhole slot, a locking pin extending through said slot having an annularly reduced portion, an adjustable support, a pendulum having a disc mounted upon said adjustable support, a ball and socket connection between said pin and pendulum, a spring-actuated shaft having a gear cooperating with the rack portion of said plate, an arm carried by said shaft, a sleeve fixed on said shaft having a slot to receive said arm and an operating rod having a slot to receive said arm forming a lost motion connection between said operating rod and said shaft.

9. A safety device of the kind described comprising a slidably mounted plate having a rack portion provided with a keyhole slot, a locking pin extending through said slot having an annularly reduced portion, an adjustable support, a pendulum having a disc mounted upon said adjustable support, a ball and socket connection between said pin and pendulum, a spring-actuated shaft having a gear cooperating with the rack portion of said plate, an arm carried by said shaft, a sleeve fixed on said shaft having a slot to receive said arm, an operating rod having a slot to receive said arm forming a lost motion connection between said operating rod and said shaft and an indicator device connected to said sleeve.

10. A safety device of the kind described comprising a slidably mounted plate, a spring actuated shaft having an operative connection with said plate, a slidably mounted pin for locking said plate, a pendulum having a positive connection with said pin for moving said pin in position to release said plate, a locking dog for said pin having a portion arranged in the path of travel of said plate and an operating rod for oscillating said shaft.

11. A safety device for internal combustion engine driven vehicles having a switch controlling the supply of electrical energy and a valve controlling the fuel supply comprising a slidably mounted plate having a keyhole slot and provided with a rack portion, a spring-actuated shaft having a gear meshing with said rack portion, a pair of spring contacts arranged in electric circuit, a bridge member carried by said plate for forming an electrical contact with said spring contacts, a fuel supply pipe for the internal combustion engine having a valve, a connection between said valve and said shaft, a pin extending through said keyhole slot and a pendulum having a ball and socket connection with said pin.

12. A safety device of the kind described comprising a slidably mounted plate having a rack portion provided with a keyhole slot, a locking pin extending through said slot having an annularly reduced portion, an adjustable support, a pendulum having a disc mounted upon said adjustable support, a ball and socket connection between said pin and pendulum, a spring-actuated shaft having a gear cooperating with the rack portion of said plate, an arm carried by said shaft, a sleeve fixed on said shaft having a slot to receive said arm, an operating rod having a slot to receive said arm forming a lost motion connection between said operating rod and said shaft and a locking device for said pin.

13. A safety device of the kind described comprising a slidably mounted plate having a rack portion provided with a keyhole slot, a locking pin extending through said slot having an annularly reduced portion, an adjustable support, a pendulum having a disc mounted upon said adjustable support, a ball and socket connection between said pin and pendulum, a spring-actuated shaft having a gear cooperating with the rack portion of said plate, an arm carried by said shaft, a sleeve fixed on said shaft having a slot to receive said arm, an operating rod having a slot to receive said arm forming a lost motion connection between said operating rod and said shaft and a pivoted locking device for said pin controlled by said slidably mounted plate.

14. In a device of the kind described, a movable plate, a pin for locking said plate, a pendulum comprising a stem having a weight movable thereon, a seat for said pendulum, a ring surrounding said seat, means for adjusting said seat and ring in respect to one another and a connection between said pendulum and said pin.

15. A safety device as herein shown and described comprising a spring actuated member, means for locking said member against the action of said spring, a pendulum comprising a stem having a connection with said locking means, a weight slidably mounted on said stem, a seat for said weight and means arranged in the upward path of travel of said weight on the stem of the pendulum for limiting the movement of said weight on said stem.

EDWARD R. NEEPER.